US012803285B2

(12) United States Patent
Hua

(10) Patent No.: US 12,803,285 B2
(45) Date of Patent: Nov. 17, 2026

(54) METHOD OF REACTIVE POWER COMPENSATION FOR MAXIMIZING AC POWER LINE TRANSMISSION EFFICIENCY UNDER VARIABLE LOAD CONDITIONS

(71) Applicant: Wei Hua, Bergen (NO)

(72) Inventor: Wei Hua, Bergen (NO)

( * ) Notice: Subject to any disclaimer, the term of this patent is extended or adjusted under 35 U.S.C. 154(b) by 134 days.

(21) Appl. No.: 18/861,941

(22) PCT Filed: May 31, 2023

(86) PCT No.: PCT/NO2023/050126
§ 371 (c)(1),
(2) Date: Oct. 31, 2024

(87) PCT Pub. No.: WO2023/234783
PCT Pub. Date: Dec. 7, 2023

(65) Prior Publication Data

US 2025/0300462 A1 Sep. 25, 2025

(30) Foreign Application Priority Data

May 31, 2022 (NO) .................................. 20220626

(51) Int. Cl.
*H02J 3/16* (2026.01)
*H02J 3/18* (2026.01)
*H02J 3/1828* (2026.01)

(52) U.S. Cl.
CPC .................................. *H02J 3/1828* (2013.01)

(58) Field of Classification Search
CPC .... H02J 3/16; H02J 3/18; H02J 3/1821; H02J 3/1828; Y02E 40/30
See application file for complete search history.

(56) References Cited

U.S. PATENT DOCUMENTS 5,642,007 A * 6/1997 Gyugyi ................. H02J 3/0014 323/207
6,118,678 A * 9/2000 Limpaecher ........ H02M 5/4505 363/60

(Continued)

FOREIGN PATENT DOCUMENTS

CN 106099891 A 11/2016
CN 110829455 A 2/2020

(Continued)

OTHER PUBLICATIONS

WIPO/ISA/EPO, International Search Report issued in International Application No. PCT/NO2023/050126 on Oct. 4, 2023, 4 pages.

(Continued)

*Primary Examiner* — Sisay G Tiku
(74) *Attorney, Agent, or Firm* — J. Peter Paredes; Amin Wasserman Gurnani LLP

(57) ABSTRACT

A method for operating a powerline is presented: —the powerline comprising a sending and a receiving end, —at least one shunt reactive power compensation device for regulating reactive power in the powerline, —means for measuring a line voltage of the powerline at the receiving end, —means for measuring reactive power to the load $Q_{load}$, —means for determining the required reactive power of the shunt reactive power compensation device, the method comprising: —receiving information on parameters for the powerline, —determining a maximum transmission efficiency parameter H for the powerline based on the parameters for the powerline, —measuring line voltage at the receiving end of the powerline, —determining required reactive power $Q_{req}$ based on the parameter H and the measured line voltage at the receiving end of the powerline, —measuring reactive power to the load $Q_{load}$, —determine the required shunt reactive power $Q_{shunt}$ based on $Q_{req}$ and the measured reactive power to the load $Q_{load}$, —regulating (Continued)

the shunt reactive power compensation device to deliver $Q_{shunt}$ to the powerline for reaching a maximum transmission efficiency of the powerline.

6 Claims, 3 Drawing Sheets

(56) References Cited

U.S. PATENT DOCUMENTS

| | | | | |
|---|---|---|---|---|
| 6,215,202 | B1 * | 4/2001 | Luongo | H02J 15/00 307/64 |
| 6,359,423 | B1 * | 3/2002 | Noro | H02J 3/12 323/208 |
| 2005/0040655 | A1 | 2/2005 | Wilkins et al. | |
| 2011/0031936 | A1 | 2/2011 | Thorburn | |
| 2013/0134789 | A1 | 5/2013 | Panosyan et al. | |

FOREIGN PATENT DOCUMENTS

| | | | |
|---|---|---|---|
| CN | 113346511 | A | 9/2021 |
| EP | 2093855 | A2 | 8/2009 |
| EP | 3220503 | A1 | 9/2017 |
| JP | S637140 | A | 1/1988 |
| WO | 2021100979 | A1 | 5/2021 |

OTHER PUBLICATIONS

WIPO/ISA/EPO, Written Opinion issued in International Application No. PCT/NO2023/050126 on Oct. 4, 2023, 7 pages.

WIPO/IPEA/EPO, Written Opinion issued in International Application No. PCT/NO2023/050126 on Mar. 6, 2024, 5 pages.

WIPO/IPEA/EPO, Written Opinion issued in International Application No. PCT/NO2023/050126 on May 21, 2024, 5 pages.

Papazoglou, T. M. "Benchmarking a double-circuit OHL for transmission efficiency." 45th International Universities Power Engineering Conference UPEC2010. IEEE, 2010, 3 pages.

Papazoglou, T. M. "Maximum efficiency of interconnected transmission lines." IEE Proceedings, Part C: Generation, Transmission and Distribution (Institution of Electrical Engineers);(United Kingdom) 141.4 (1994), pp. 353-356.

Pradhan, A. K., et al. "Maximum efficiency of flexible AC transmission systems." International Journal of Electrical Power & Energy Systems 28.8 (2006): 581-588.

Norwegian Intellectual Property Office, Norwegian Search Report issued in corresponding Norwegian Patent Application No. 20220626 on Dec. 30, 2022, 3 pages.

Norwegian Intellectual Property Office, Office Action issued in corresponding Norwegian Patent Application No. 20220626 on Dec. 31, 2022, 5 pages.

Norwegian Intellectual Property Office, Office Action issued in corresponding Norwegian Patent Application No. 20220626 on Dec. 11, 2023, 9 pages.

Norwegian Intellectual Property Office, Office Action issued in corresponding Norwegian Patent Application No. 20220626 on Oct. 28, 2024, 4 pages.

Norwegian Intellectual Property Office, Office Action issued in corresponding Norwegian Patent Application No. 20220626 on Jan. 6, 2025, 2 pages.

* cited by examiner

METHOD OF REACTIVE POWER COMPENSATION FOR MAXIMIZING AC POWER LINE TRANSMISSION EFFICIENCY UNDER VARIABLE LOAD CONDITIONS

CROSS-REFERENCE TO RELATED APPLICATIONS

The present application claims priority to PCT application serial no. PCT/NO2023/050126, filed May 31, 2023, which claims priority to Norwegian patent application Ser. No. 20/220,626, filed May 31, 2022, each herein incorporated by reference in their entireties.

FIELD OF THE INVENTION

The present invention relates to a method for operating a powerline in a system. Where the line is to be operated at its corresponding maximum efficiency for any applied load.

BACKGROUND OF THE INVENTION

The current invention concerns a method for improve power transmission efficiency for any types of ac power line, so that the power line can operate with a corresponding maximum transmission efficiency for any load conditions.

Electricity is essential for modern life. After electricity is generated, it must be transmitted from the source of generation to the consumers through power transmission and distribution systems. The power lines in power transmission and distribution systems can be overhead lines, underground cables, submarine cables, or combined. Power losses occurs at each stage of the power transmission and distribution system and line losses represent a major cost in the delivery of electrical energy. Therefore, improving electrical power system transmission efficiency is significant for energy saving, cost saving and overall reduction of emission related to delivering electrical power.

Electrical energy is mostly generated, transmitted, distributed, and utilized as alternating current (AC). Connected to the transmission of alternating current there are losses both related to the active power P and the reactive power Q. The changing of reactive power affects the voltage, current and phase shift between voltage and current along the power transmission line, which in turn affects the power losses.

There are ways to improve AC transmission line efficiency. Power factor control is the most common and proven technology. The goal of this technology is to improve power factor (reduce reactive power) to improve power line transmission efficiency. However, high power factor is not always the most optimal method to improve line transmission efficiency, especially when the line operates under low load conditions.

Constant reactive power control is also used for some applications, but it is not always easy to size how much reactive power a system needs. And the demand for reactive power will change with changing loads in the system.

Reactive power compensation technology is widely used to improve power system transmission efficiency and performance. In practice the goal is to improve power factor (reduce reactive power) which is thought to improve power line transmission efficiency.

For the reasons explained above, a solution is developed to improve power line transmission efficiency, where the power line will always operate at a corresponding maximum transmission efficiency for any given load condition.

THEORETICAL BACKGROUND OF THE INVENTION

Theoretically, a powerline can be represented by an infinite series of resistors, inductors in series and capacitors in parallel (There is also shunt conductance G, which is neglected in many types of powerlines in 50, and 60 Hz systems).

In theory, energy losses only occur in electrical resistors and not pure inductors or capacitors. However, all powerlines have shunt capacitance that generates a capacitive current which leads to higher resistive losses. The equation below explains the relation between power loss $P_L$, current and resistance.

$$P_L = I^2 R$$

The voltage, current and phase shift between voltage and current along the power line depend on both the load (including active power P and reactive power Q) and the powerline properties. Meaning that the power line losses are affected by both load and the properties of the powerline. Therefore, changing the reactive power at the powerline output side affects the powerline losses for a given active power P delivered to the consumer (load).

To describe the calculation for the maximum transmission efficiency of the method, some power line calculations and modelling approaches will be described in this chapter.

There are four basic parameters for power line model and analyses, series resistance (R), series inductance (L), shunt capacitance (C) and shunt conductance (G). A two-terminal passive components model of an AC power line has been used to illustrate the power transfer characteristic, as shown in FIG. 1.

The model represents a single-phase power line. The sending end represents as power source, and the receiving end represents as consumer, $U_s$ and $I_s$ are the sending-end voltage and current, and $U_r$ and $I_r$ are the receiving-end voltage and current. The relation between the sending end and receiving end quantities can be written as:

$$\begin{bmatrix} U_s \\ I_s \end{bmatrix} = \begin{bmatrix} A & B \\ C & D \end{bmatrix} * \begin{bmatrix} U_r \\ I_r \end{bmatrix}$$

And $$U_s = A * U_r + B * I_r$$

$$I_s = C * U_r + D * I_r$$

The parameters A, B, C, D depend on the power line constants R, L, C and G, they are complex values.

The line constants R, L, C and G are normally as per-length values, having units of Ω/km, H/km, f/km and S/km, they are uniformly distributed along the length of the line. Several important parameters can be calculated based on these four line-constants.

$$z = R + j\omega L,\ \frac{\Omega}{\text{km}},\ \text{series impedance per unit length}$$

$$y = G + j\omega C,\ \frac{S}{\text{km}},\ \text{shunt admittance per unit length}$$

$$Z_c = \sqrt{\frac{z}{y}}\ \Omega,\ \text{characteristic impedance}$$

-continued $$\gamma = \sqrt{zy}\ 1/\text{km, propagation constant}$$

The propagation constant $\gamma$ is a complex value, and can be expressed as follows:

$$\gamma = \alpha + j\beta, \text{ propagation constant}$$

$$\alpha - \text{attenuation constant}$$

$$\beta - \text{phase constant}$$

The parameters A, B, C and D for the two-port network are:

$$A = \cosh(\gamma l), \text{ per unit}$$

$$B = \sinh(\gamma l)Z_c, \Omega$$

$$C = \frac{\sinh(\gamma l)}{Z_c}, \text{ Siemens}$$

$$D = A, \text{ per unit}$$

Where l is the length of power line.

The voltage and current in complex number form are:

$$V_r = V_{r_{abs}} * (\cos\theta_{V_r} + 1j*\sin\theta_{V_r})$$

where $V_{r_{abs}}$ is the absolute value or RMS value of voltage, and $\theta_{V_r}$ is the voltage phase angle $$I_r = I_{r_{abs}} * (\cos\theta_{I_r} + 1j*\sin\theta_{I_r})$$

where $I_{r_{abs}}$ is the absolute value or RMS value of current, and $\theta_{I_r}$ is the current phase angle $$\varphi_r = \theta_{V_r} - \theta_{I_r}$$

$\varphi_r$ is the phase difference between voltage and current

And $$\begin{cases} V_r * \overline{V}_r = {V_{r_{abs}}}^2 \\ I_r * \overline{I}_r = {I_{r_{abs}}}^2 \\ V_r * \overline{I}_r = V_{r_{abs}} * I_{r_{abs}} * (\cos\varphi_r + 1j*\sin\varphi_r) \\ \overline{V}_r * I_r = V_{r_{abs}} * I_{r_{abs}} * (\cos\varphi_r - 1j*\sin\varphi_r) \end{cases}$$

The complex power (apparent power) in an AC system is calculated as:

$$S = \text{V} * \overline{I}$$

Where, V and I are voltage and current in complex value and $\overline{V}$ and $\overline{I}$ is the conjugate of the current and voltage (complex value).

DISCLOSURE OF THE STATE OF ART

EP 2093855 A2, teaches systems and methods of dynamic reactive power support for a power transmission system. In one embodiment, a method of dynamic reactive power support for a power transmission system includes at least one circuit breaker connecting a shunt capacitor bank containing at least one shunt capacitor with a metal oxide varistor (MOV) connected in parallel. A controller is used to detect a voltage drop at the power transmission system (e.g., substation bus). In response to detecting the voltage drop, the controller closes the circuit breaker(s) connecting the shunt capacitors to the power transmission system. The controller then monitors at least one MOV to detect a current flow. Upon detection of a current flow in the MOV, the controller disconnects one or more shunt capacitors from the power transmission system by opening one or more circuit breakers. The shunt capacitors may be disconnected simultaneously, sequentially, in groups, or otherwise.

CN 113346511 A, teaches a reactive power compensation correction method. The method comprises the following steps of: measuring impedance values at two sides of a power frequency under different frequencies; and comparing the impedance values measured in the previous step to carry out compensation correction. The phase angle difference of voltage and current does not need to be measured in the whole process. The correction method is different from an existing traditional compensation method and does not need to measure the phase angle difference of the voltage and the current, the measurement scheme is simplified, the equipment cost is reduced, the fault rate is reduced, and the stability is improved.

EP 3220503 A1, teaches a power cable assembly for transferring high voltage alternating current over long distances. The assembly comprises continuous power cables where each power cable comprises a core, a conductor and cable insulation. It further comprises shunt inductances connected to each conductor at regular intervals along each conductor. The invention further comprises a method for providing a power cable assembly for transferring high voltage alternating current over long distances by means of continuous power cables where each power cable comprises a core, a conductor and cable insulation. The method is characterized in connecting shunt inductances to each conductor at regular intervals.

US 2005040655 A1, teaches real and reactive power control for wind turbine generator systems. The technique described herein provides the potential to utilize the total capacity of a wind turbine generator system (e.g., a wind farm) to provide dynamic VAR (reactive power support). The VAR support provided by individual wind turbine generators in a system can be dynamically varied to suit application parameters.

CN 110829455 A, teaches a reactive compensation method for a capacitor of a power distribution network comprising the following steps of: determining an optimal compensation point in a reactive margin manner, monitoring the voltage of the compensation point on line, and controlling a switched capacitor by taking the voltage as a constraint condition so as to dynamically adjust the compensation capacity; and performing capacitor compensation on voltage drop caused by the impact load, analysing the harmonic influence brought by lag of the capacitors connected in parallel when the capacitors are connected to the power distribution network, and connecting reactors to the capacitors in series to suppress the amplification effect of the capacitors connected in parallel on harmonic waves so as to reduce the influence of load impact on the power grid.

US 2013134789 A1, teaches a reactive power compensation method including generating a variable power factor curve for at least one power generator based on information regarding network parameters; obtaining a value of an active output power parameter from the at least one generator; computing a reactive power based on the variable power factor curve and the value of the active power output parameter of the at least one generator; generating a reactive power compensation command based on the computed reactive power; and transmitting the reactive power compensation command to the at least one power generator for controlling operation of the at least one power generator.

OBJECTS OF THE PRESENT INVENTION

The object of this invention is to present a method for improving transmission efficiency for any type of AC power line, so that the power line can always operate with the corresponding maximum transmission efficiency for any load condition. The advantage of the invention compared to prior art is thus to be able to continuously operate an AC transmission line at an optimal operation point for varying load conditions. This leads to higher transmission capacity, lower transmission cost and reduced emissions related to delivering power to consumers.

SUMMARY OF THE INVENTION

An aspect of the present invention is a method for operating a powerline:

- the powerline comprising a sending and a receiving end,
- at least one shunt reactive power compensation device for regulating reactive power in the powerline,
- means for measuring a line voltage of the powerline at the receiving end,
- means for measuring reactive power to the load $Q_{load}$,
- means for determining the required reactive power of the shunt reactive power compensation device,
- said method comprising:
  - receiving information on parameters for the powerline,
- determining a maximum transmission efficiency parameter H for the powerline based on the parameters for the powerline,
- measuring line voltage at the receiving end of the powerline,
- determining required reactive power $Q_{req}$ based on the parameter H and the measured line voltage at the receiving end of the powerline,
- measuring reactive power to the load $Q_{load}$,
- determine the required shunt reactive power $Q_{shunt}$ based on $Q_{req}$ and the measured reactive power to the load $Q_{load}$,
- regulating the shunt reactive power compensation device to deliver $Q_{shunt}$ to the powerline for reaching a maximum transmission efficiency of the powerline.

In embodiments the present invention H is determined based on a set of powerline parameters: a resistance R per unit length, a capacitance C per unit length, an inductance L per unit length, a length, and a frequency.

In embodiments of the present invention the shunt reactive power compensation device is connected to the powerlines receiving end.

In embodiments of the present invention the parameter H is calculated based on a set of powerline parameters ABCD for a powerline two port model, the ABCD parameters are determined based on the series resistance R, the shunt capacitance C, the series inductance L and the shunt conductance G where H is determined by:

$$H = -\frac{\mathrm{imag}(B * \overline{C})}{\mathrm{real}(2 * B * \overline{D})}$$

In embodiments of the present invention the parameter H is calculated based on a set of powerline parameters an attenuation constant α, an attenuation constant β of propagation constant γ, a series resistance of the powerline R and a length of the powerline l, where H is determined by:

$$H = \frac{2\alpha^2\beta^2(\cosh 2\alpha l - \cos 2\beta l)}{R(\alpha^2 + \beta^2)(\beta \sinh 2\alpha l + \alpha \sin 2\beta l)}$$

In embodiments of the present invention the parameter H for a short distance power line is estimated based on a set of powerline parameters an operational frequency f, a powerline shunt capacitance per unit length $C_{line}$ and a length of the powerline l, where H is determined by:

$$H = \pi * f * c_{line} * l$$

In embodiments of the present invention the required reactive power $Q_{req}$ at the powerlines receiving end is determined based on the parameter H and a measured line voltage at the receiving end of the powerline, wherein $Q_{req}$ is determined by:

$$Q_{req} = H * U_r^2$$

In embodiments of the present invention a device comprises a connection to a receiving end of the powerline comprising:

- at least one shunt reactive power compensation device for injecting reactive power into the powerline,
- means for measuring a line voltage of the powerline at the receiving end,
- means for measuring reactive power to the load $Q_{load}$,
- means for determining the required reactive power to be injected by the shunt reactive power compensation device,
- wherein the means for determining the required reactive power is determined by the method stated within the embodiments of the invention. In embodiments the shunt reactive power compensation device is connected to the powerlines receiving end.

DESCRIPTION OF THE FIGURES

Embodiments of the present invention will now be described, by way of example only, with reference to the following figures, wherein.

DESCRIPTION OF PREFERRED EMBODIMENTS OF THE INVENTION

Figure 1:
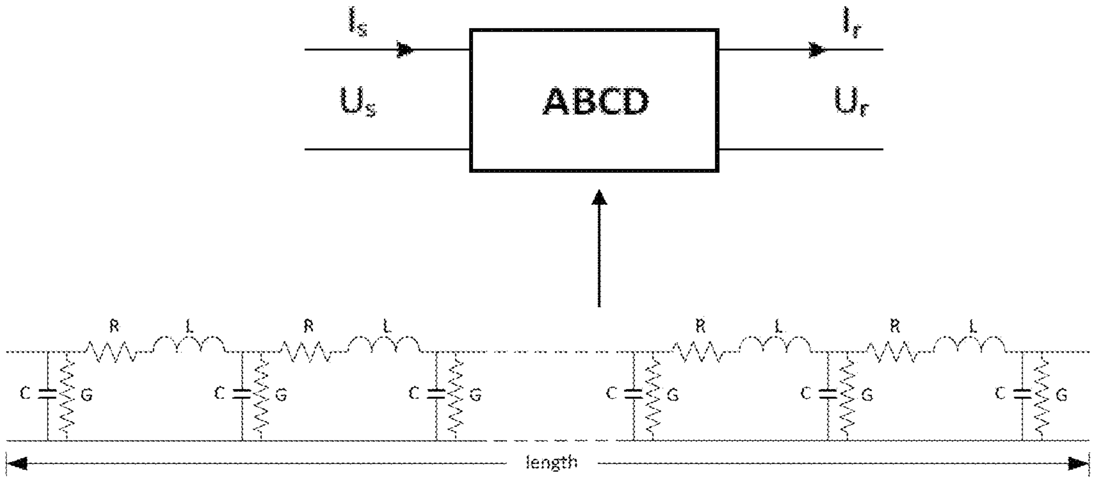
FIG. 1 shows a two port passive components model of a single-phase power line.

FIG. 1 shows the two-terminal passive components model of an AC power line as described earlier in this application. The mathematical equation used to calculate the value of the maximum transmission efficiency parameter H is derived from this model. By using the equations from the model:

$$\begin{cases} V_s = AV_r + BI_r \\ I_s = CV_r + DI_r \end{cases}$$

And deriving the apparent power S at the sending-end:

$$\begin{aligned} S_s &= V_s * \overline{I_s} \\ &= (A * V_r + B * I_r) * (\overline{C} * \overline{V_r} + \overline{D} * \overline{I_r}) \\ &= A * \overline{C} * V_r * \overline{V_r} + B * \overline{D} * I_r * \overline{I_r} + A * \overline{D} * V_r * \overline{I_r} + B * \overline{C} * \overline{V_r} * I_r \\ &= \begin{matrix} A * \overline{C} * {V_{r_{abs}}}^2 + B * \overline{D} * {I_{r_{abs}}}^2 + A * \overline{D} * V_{r_{abs}} * I_{r_{abs}} * (\cos\varphi_r + \\ 1j * \sin\varphi_r) + B * \overline{C} * V_{r_{abs}} * I_{r_{abs}} * (\cos\varphi_r - 1j * \sin\varphi_r) \end{matrix} \end{aligned}$$

$\varphi_r$ – is the phase shift between voltage and current at the output side

After rearrangement and simplification:

$$S_s = \left({V_{r_{abs}}}^2 * \mathrm{real}(A * \overline{C}) + {I_{r_{abs}}}^2 * \mathrm{real}(B * \overline{D}) + V_{r_{abs}} * I_{r_{abs}} * \left(\mathrm{real}(A * \overline{D}) * \cos\varphi_r + \mathrm{real}(B * \overline{C}) * \cos\varphi_r + \mathrm{imag}(B * \overline{C}) * \sin\varphi_r\right)\right) + 1j * \left({V_{r_{abs}}}^2 * \mathrm{imag}(A * \overline{C}) + {I_{r_{abs}}}^2 * \mathrm{imag}(B * \overline{D}) + V_{r_{abs}} * I_{r_{abs}} * \left(\mathrm{real}(A * \overline{D}) * \sin\varphi_r - \mathrm{real}(B * \overline{C}) * \sin\varphi_r + \mathrm{imag}(B * \overline{C}) * \cos\varphi_r\right)\right)$$

The apparent power can be expressed as:

$$S_s = P_s + 1j * Q_s$$

And the active power:

$$P_s = {V_{r_{abs}}}^2 * \mathrm{real}(A * \overline{C}) + {I_{r_{abs}}}^2 * \mathrm{real}(B * \overline{D}) + \left(\mathrm{real}(A * \overline{D}) + \mathrm{real}(B * \overline{C})\right) *$$

-continued $$V_{r_{abs}} * I_{r_{abs}} * \cos\varphi_r + \mathrm{imag}(B * \overline{C}) * V_{r_{abs}} * I_{r_{abs}} * \sin\varphi_r$$

Using the following relations:

$$\begin{cases} P_r = V_{r_{abs}} * I_{r_{abs}} * \cos\varphi_r \\ Q_r = V_{r_{abs}} * I_{r_{abs}} * \sin\varphi_r \\ {I_{r_{abs}}}^2 = \dfrac{{S_r}^2}{{V_{r_{abs}}}^2} = \dfrac{1}{{V_{r_{abs}}}^2} * ({P_r}^2 + {Q_r}^2) \end{cases}$$

We express the active power of the sending end:

$$\begin{aligned} P_s &= \begin{matrix} {V_{r_{abs}}}^2 * \mathrm{real}(A * \overline{C}) + \dfrac{\mathrm{real}(B * \overline{D})}{{V_{r_{abs}}}^2} * ({P_r}^2 + {Q_r}^2) + \\ (\mathrm{real}(A * \overline{D}) + \mathrm{real}(B * \overline{C})) * P_r + \mathrm{imag}(B * \overline{C}) * Q_r \end{matrix} \\ &= \begin{matrix} \dfrac{\mathrm{real}(B * \overline{D})}{{V_{r_{abs}}}^2} * {Q_r}^2 + \mathrm{imag}(B * \overline{C}) * Q_r + \dfrac{\mathrm{real}(B * \overline{D})}{{V_{r_{abs}}}^2} * \\ {P_r}^2 + (\mathrm{real}(A * \overline{D}) + \mathrm{real}(B * \overline{C})) * P_r + {V_{r_{abs}}}^2 * \mathrm{real}(A * \overline{C}) \end{matrix} \end{aligned}$$

The electric energy loss of the power line can then be expressed as:

$$\Delta P = P_s - P_r = \frac{\mathrm{real}(B * \overline{D})}{{V_{r_{abs}}}^2} * {Q_r}^2 + \mathrm{imag}(B * \overline{C}) * Q_r + \frac{\mathrm{real}(B * \overline{D})}{{V_{r_{abs}}}^2} * {P_r}^2 + (\mathrm{real}(A * \overline{D}) + \mathrm{real}(B * \overline{C}) - 1) * P_r + {V_{r_{abs}}}^2 * \mathrm{real}(A * \overline{C})$$

By assuming the operational voltage and receiving end real power to be constant we can express the power loss of the power line as a function of the reactive power at the receiving end $Q_r$:

$$\Delta P = f(Q_r)$$

$$f(Q_r) = \frac{\mathrm{real}(B * \overline{D})}{{V_{r_{abs}}}^2} * Q_r^2 + \mathrm{imag}(B * \overline{C}) * Q_r + K$$

Where K is a constant:

$$K = \frac{\mathrm{real}(B * \overline{D})}{{V_{r_{abs}}}^2} * {P_r}^2 + (\mathrm{real}(A * \overline{D}) + \mathrm{real}(B * \overline{C}) - 1) * P_r + {V_{r_{abs}}}^2 * \mathrm{real}(A * \overline{C})$$

Taking the derivative with respect to $Q_r$ of the function of the power loss:

$$f'(Q_r) = 2 * \frac{\mathrm{real}(B * \overline{D})}{{V_{r_{abs}}}^2} * Q_r + \mathrm{imag}(B * \overline{C})$$

The minimum electric power loss ΔP happens when $f'(Q_r)=0$:

$$2*\frac{\text{real}\left(B*\bar{D}\right)}{V_{r_{abs}}{}^{2}}*Q_r+\text{imag}\left(B*\bar{C}\right)=0$$

$$Q_r=-\frac{\text{imag}\left(B*\bar{C}\right)}{2*\text{real}\left(B*\bar{D}\right)}*V_{r_{abs}}{}^{2}=-\frac{\text{imag}\left(B*\bar{C}\right)}{\text{real}\left(2*B*\bar{D}\right)}*V_{r_{abs}}{}^{2}$$

We set H to be the multiplier with $Vr_{abs}^{2}$ as the multiplicand and $Q_r$ as the product:

$$H=-\frac{\text{imag}\left(B*\bar{C}\right)}{\text{real}\left(2*B*\bar{D}\right)}$$

The parameter H is called the maximum transmission parameter for a power line. Since the power line parameters B, C, D are constant for a specific powerline operating with a specific operation frequency. The parameter H is constant for a specific powerline operate with a specified operation frequency.

Following from the above derivation we have that the required reactive power to control a power line to operate at the corresponding maximum efficiency point is given by the following equation:

$$Q_{req}=H*V_{r_{abs}}{}^{2}$$

The expression for H can also be given based on attenuation α and phase β constants.

$$H=\frac{2\alpha^2\beta^2\left(\cosh 2\alpha l-\cos 2\beta l\right)}{R\left(\alpha^2+\beta^2\right)\left(\beta\sinh 2\alpha l+\alpha\sin 2\beta l\right)}$$

We arrive at the above expression by substituting the following into the original equation for H:

$$\begin{aligned}B*\bar{C}&=\sinh\gamma l*Z_c*\overline{\left(\frac{\sinh\gamma l}{Z_c}\right)}\\&=\sinh\gamma l*\overline{\sinh\gamma l}*\frac{Z_c}{(\bar{Z_c})}\\&=\sinh(\alpha l+1j*\beta l)*\overline{\sinh(\alpha l+1j*\beta l)}*\frac{Z_c}{(\bar{Z_c})}\\&=\frac{1}{2}\left(\cosh 2\alpha l-\cos 2\beta l\right)*\frac{\left(\beta^2-\alpha^2\right)-2j*\alpha\beta}{\left(\alpha^2+\beta^2\right)}\\&=\frac{\left(\cosh 2\alpha l-\cos 2\beta l\right)}{2\left(\alpha^2+\beta^2\right)}*\left[\left(\beta^2-\alpha^2\right)-2j*\alpha\beta\right]\\\text{imag }B*\bar{C}&=-\frac{\alpha*\beta*\left(\cosh 2\alpha l-\cos 2\beta l\right)}{\left(\alpha^2+\beta^2\right)}\end{aligned}$$

And:

$$\begin{aligned}&=2\sinh\gamma l*\overline{\cosh\gamma l}*Z_c\\&=2\sinh(\alpha l+j\beta l)*\overline{\cosh(\alpha l+j\beta l)}*Z_c\\&=\left(\sinh 2\alpha l+1j*\sin 2\beta l\right)*\frac{R}{2}\left(\frac{1}{\alpha}-1j*\frac{1}{\beta}\right)\\&=\frac{R}{2}\left(\frac{\sinh 2\alpha l}{\alpha}+\frac{\sin 2\beta l}{\beta}\right)+1j*\frac{R}{2}\left(\frac{\sin 2\beta l}{\alpha}-\frac{\sinh 2\alpha l}{\beta}\right)\end{aligned}$$

-continued $$=\frac{R}{2*\alpha*\beta}\left(\beta*\sin 2\alpha l+\alpha*\sin 2\beta l\right)+\frac{1j*R}{2*\alpha*\beta}\left(\beta*\sin 2\beta l-\alpha*\sinh 2\alpha l\right)$$

$$\text{real}\left(2*B*\bar{D}\right)=\frac{R}{2*\alpha*\beta}\left(\beta*\sinh 2\alpha l+\alpha*\sin 2\beta l\right)$$

For a short powerline the magnitude of the parameter H is very close to half of the power line total shunt susceptance. Therefore, the following formula can be used to approximate it $H\sim\pi fC_{cable}l$, where f is the frequency, $C_{cable}$ is the cable capacitance per length and l is the cable length. Hence the parameter H is given by the following equations:

$$H=\begin{cases}-\dfrac{\text{imag}\left(B*\bar{C}\right)}{\text{real}\left(2*B*\bar{D}\right)}; & (1)\\[2ex]\dfrac{2\alpha^2\beta^2\left(\cosh 2\alpha l-\cos 2\beta l\right)}{R\left(\alpha^2+\beta^2\right)\left(\beta\sinh 2\alpha l+\alpha\sin 2\beta l\right)}; & (2)\\[2ex]\pi*f*c_{cable}*\text{length}; & (3)\text{ for short length powerline}\end{cases}$$

And the required reactive power at the receiving end of the power line is given by the following equation, where $$U_r^2$$

is the square of the RMS value for the line voltage at the receiving end:

$$Q_{req}=H*U_r^2$$

The value of the required shunt reactive power is given by:

$$Q_{shunt}=Q_{req}-Q_{load}$$

Where the reactive power to be supplied by the shunt is equal to the required reactive power at the power lines receiving end minus the reactive power of the load.

Hence the method consists of the steps of determining the parameter H based on the power line constants as described. Further the required reactive power at the receiving end is calculated based on H and the measured voltage. The shunt reactive power is then determined based on the calculated required reactive power and the measured reactive power of the load. Thereafter the method regulates the shunt reactive power compensation device to reach a corresponding maximum transmission efficiency for the powerline.

There are many available technologies for regulating the reactive power of power lines, such as shunt reactor, shunt capacitor, SVC, STATCOM, synchronous condenser, etc. Depending on the reactive power of the load and the power line capacitive power, the reactive power of the shunt compensator ($Q_{shunt}$) can be capacitive or inductive or even changing during operation. The selection of the preferred reactive compensation technology should be possible for the skilled person depending on the consumers (load) and operation requirements of the application.

Figure 2:
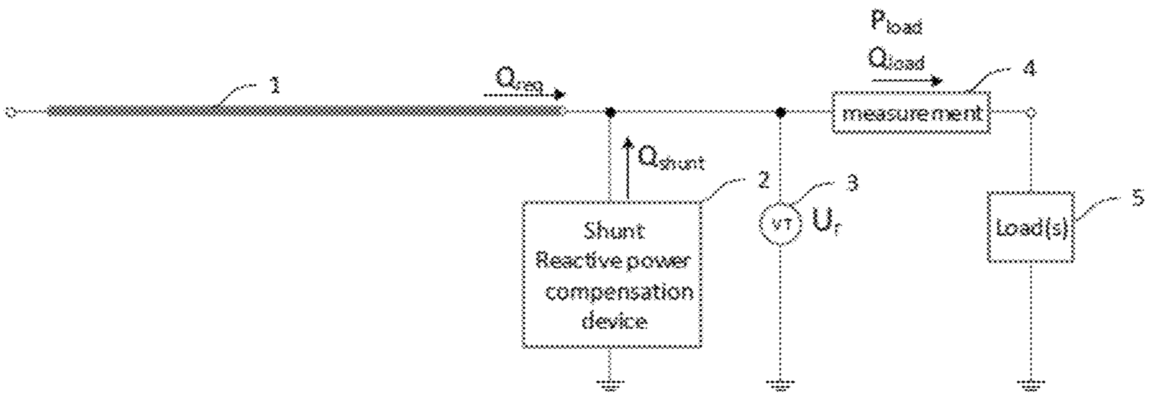
FIG. 2 shows an equipment set up according to the method.

In FIG. 2 a setup for conducting the steps of the method is shown. A powerline 1 has a shunt reactive power compensation device 2, a voltage measurement device 3, a reactive load measuring device 4 and load 5 connected to it. In this example the shunt reactive power compensation device, the voltage measurement device and the reactive load measuring device is connected at the end of the power line at the receiving end near the load. This is an embodiment of the invention, and these components can be connected at any location along the power line and also more sets of these components can be connected at different sections of the power line.

In FIG. 3-6 two examples are given to demonstrate the effectiveness of the method. Both examples are three phase ac power lines, the first is a 33 kV underground cable for an urban power distribution system, and the second is a 150 kV submarine cable for power transmission systems. The power line data and parameters are listed in the Table 1.

TABLE 1

Data of power cable for examples

| Symbol | Units | Underground distribution cable | Subsea transmission cable | Description |
|---|---|---|---|---|
| f | Hz | 50 | 50 | Operating frequency |
| $U_n$ | kV | 33 | 150 | Operating voltage, phase to phase |
| P | MW | 5-25 | 20-100 | Active power range of load |
| cos φ | pu | 0.2-1 | 0.2-1 | Power factor range of load |
| L | km | 20 | 150 | Cable length |
| S | $mm^2$ | 240 | 500 | Cable cross-section of phase conductor |
| I | A | 480 | 650 | Continue current carrying capacity |
| R | Ω/km | 0.098 | 0.0549 | Cable series AC resistance |
| L | mH/km | 0.40 | 0.42 | Cable series inductance |
| C | μF/km | 0.228 | 0.1725 | Cable shunt capacitance |
| H | Siemens | 7.1628e−4 | 4.1e−3 | Maximum transmission efficiency parameter |
| $Q_{req}$ | MVAr | 0.78 | 91.3862 | The required reactive power for three phase to operate with maximum transmission efficient at the rated operation voltage $U_n$. In these examples it is inductive reactive power. |

Numerical analysis is performed to study the theoretical power transmission efficiency for the power cables under different load conditions. The power transmission efficiency with the invented method is analyzed as well.

Figure 3:
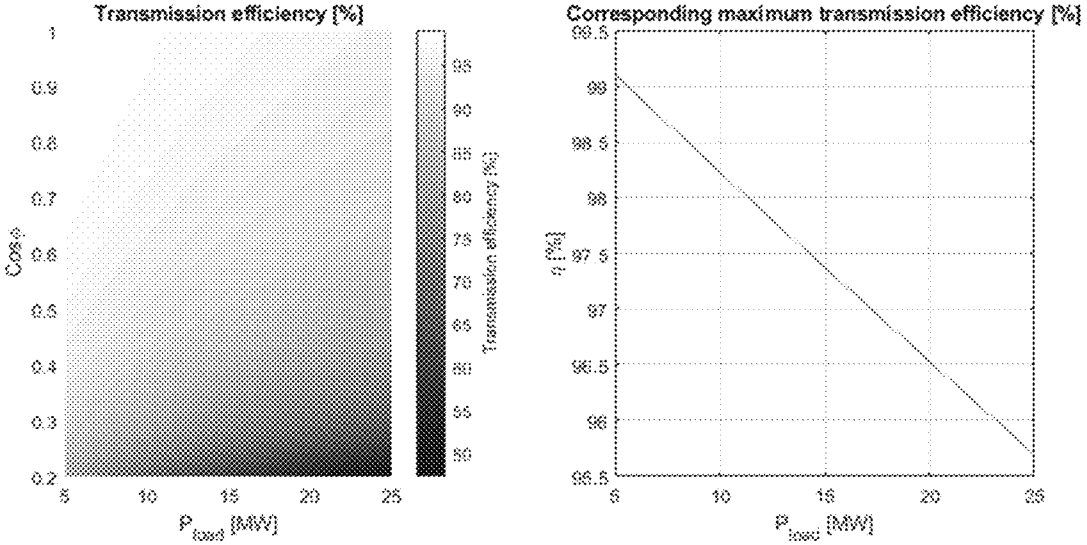
FIG. 3 shows overall transmission efficiency for a 20 km 33 kV underground distribution cable with active power between 5-20 MW and power factor 0.2-1. The figure shows a colour plot for both variables and a cure corresponding to the maximum transmission efficiency for optimal power factor at the given load.

In FIG. 3, a 20 km under-ground distribution power cable has been simulated. In the simulation the load has a constant operation voltage (Un), which is 33 kV. The figure shows the overall transmission efficiency for loads from 5 MW to 25 MW and power factor from 0.2 to 1, a color plot of the transmission efficiency and a plot of the theoretical corresponding maximum transmission efficiency curve.

Figure 4:
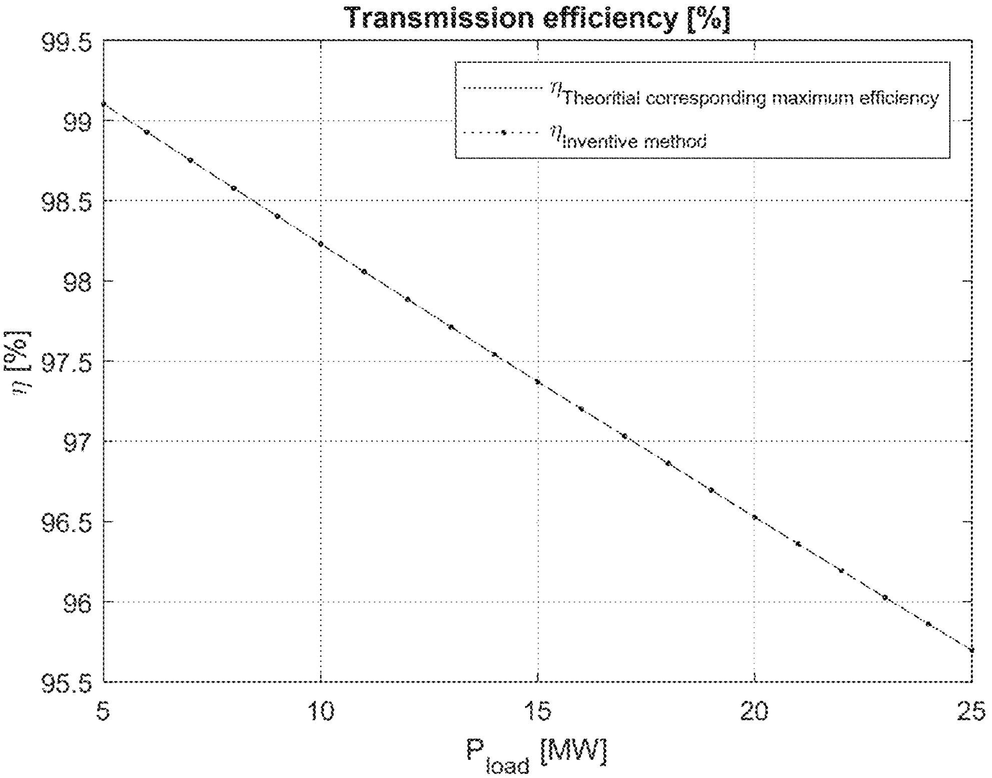
FIG. 4 shows a plot of the theoretical maximum efficiency and of the efficiency when using the method for the 33 kV underground distribution cable of FIG. 3.

FIG. 4 shows the transmission efficiency curve according to the simulation as well as the theoretical corresponding maximum transmission efficiency curve, which confirms that the power line operates at the corresponding maximum transmission efficiency point for any load conditions with the method.

Table 2 shows values for the theoretical corresponding maximum transmission efficiency, and the transmission efficiency according to the invented method, the load is from 5 MW to 25 MW, where 1 MW is used for each step in the table.

TABLE 2

33 kV underground distribution cable, theoretical maximum transmission efficiency and transmission efficiency according to the method

| $P_{load}$ [MW] | Theoretical corresponding maximum Transmission efficiency [%] | Transmission efficiency with the invented method [%] |
|---|---|---|
| 5 | 99.10 | 99.10 |
| 6 | 98.93 | 98.93 |
| 7 | 98.75 | 98.75 |
| 8 | 98.58 | 98.58 |
| 9 | 98.40 | 98.40 |
| 10 | 98.23 | 98.23 |
| 11 | 98.06 | 98.06 |
| 12 | 97.89 | 97.89 |
| 13 | 97.71 | 97.71 |
| 14 | 97.54 | 97.54 |
| 15 | 97.37 | 97.37 |

TABLE 2-continued 33 kV underground distribution cable, theoretical maximum transmission efficiency and transmission efficiency according to the method

| $P_{load}$ [MW] | Theoretical corresponding maximum Transmission efficiency [%] | Transmission efficiency with the invented method [%] |
|---|---|---|
| 16 | 97.20 | 97.20 |
| 17 | 97.03 | 97.03 |
| 18 | 96.86 | 96.86 |
| 19 | 96.70 | 96.70 |
| 20 | 96.53 | 96.53 |
| 21 | 96.36 | 96.36 |
| 22 | 96.19 | 96.19 |
| 23 | 96.03 | 96.03 |
| 24 | 95.86 | 95.86 |
| 25 | 95.70 | 95.70 |

Figure 5:
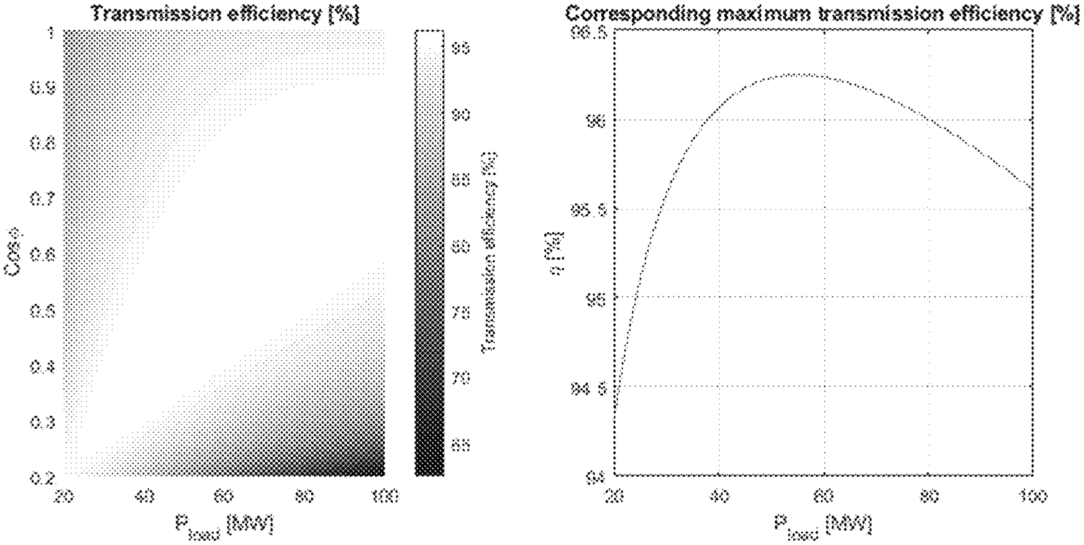
FIG. 5 shows overall transmission efficiency for a 150 km 150 kV submarine transmission cable with active power between 20-100 MW and power factor 0.2-1. The figure shows a colour plot for both variables and a curve corresponding to the maximum transmission efficiency for optimal power factor at the given load.

In FIG. 5, a 150 km submarine transmission power cable has been simulated. In the simulation the load has a constant operation voltage (Un), which is 150 kV. The figure shows the overall transmission efficiency for loads from 20 MW to 100 MW and power factor from 0.2 to 1, a color plot of the transmission efficiency and a plot of the theoretical corresponding maximum transmission efficiency curve.

Figure 6:
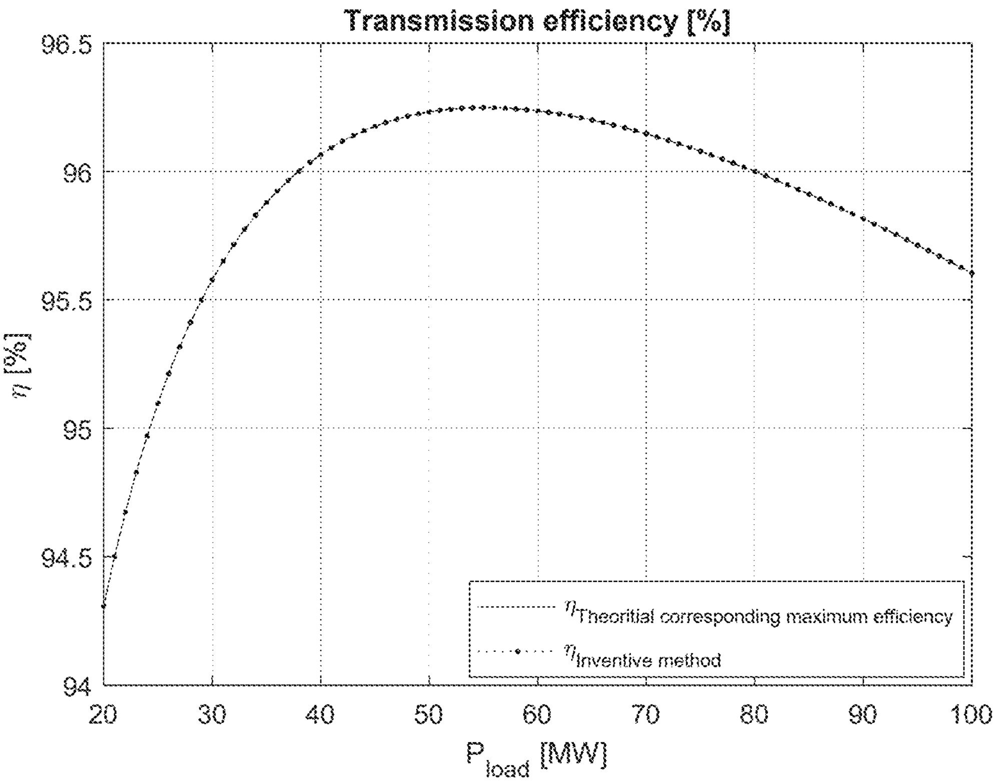
FIG. 6 shows a plot of the theoretical maximum efficiency and of the efficiency when using the method for the 150 kV submarine transmission cable of FIG. 5.

FIG. 6 shows the transmission efficiency curve according to the simulation as well as the theoretical corresponding maximum transmission efficiency curve, which confirms that the power line operates at the corresponding maximum transmission efficiency point for any load conditions with the method.

Table 3 shows values for the theoretical corresponding maximum transmission efficiency, and the transmission efficiency according to the invented method, the load is from 20 MW to 100 MW, where 5 MW is used for each step in the table.

TABLE 3

150 kV submarine transmission cable, theoretical maximum transmission efficiency and transmission efficiency according to the method

| $P_{load}$ [MW] | Theoretical corresponding maximum Transmission efficiency [%] | Transmission efficiency with the invented method [%] |
|---|---|---|
| 20 | 94.31 | 94.31 |
| 25 | 95.10 | 95.10 |
| 30 | 95.58 | 95.58 |
| 35 | 95.88 | 95.88 |
| 40 | 96.07 | 96.07 |
| 45 | 96.18 | 96.18 |
| 50 | 96.23 | 96.23 |
| 55 | 96.25 | 96.25 |
| 60 | 96.24 | 96.24 |
| 65 | 96.20 | 96.20 |
| 70 | 96.15 | 96.15 |
| 75 | 96.08 | 96.08 |
| 80 | 96.00 | 96.00 |
| 85 | 95.91 | 95.91 |
| 90 | 95.82 | 95.82 |
| 95 | 95.71 | 95.71 |
| 100 | 95.60 | 95.60 |

The invention claimed is:

1. A method for operating an AC power transmission line (1) by means of a device, the AC power transmission line (1) comprising a sending and a receiving end, wherein the receiving end of the AC power transmission line (1) is connected to an applied load (5), wherein the device comprises:

at least one shunt reactive power compensation device (2) connected to the receiving end of the AC power transmission line (1), wherein the at least one shunt reactive power compensation device (2) is configured to regulate reactive power in the AC power transmission line (1), means adapted to measure a line voltage of the AC power transmission line (1) at the receiving end, means adapted to measure reactive power $Q_{load}$ to the applied load (5) of the AC power transmission line (1), which the applied load (5) comprises an active power part and a reactive power part, means adapted to determine a required reactive power of the at least one shunt reactive power compensation device (2), said method comprising executing the following steps to the applied load of the AC power transmission line (1), receiving information on parameters for the AC power transmission line (1), determining a maximum transmission efficiency parameter H for the AC power transmission line (1) based on the parameters for the AC power transmission line (1), measuring the line voltage at the receiving end of the AC power transmission line (1), determining required reactive power $Q_{req}$ based on the maximum transmission efficiency parameter H and the measured line voltage at the receiving end of the AC power transmission line (1), measuring the reactive power $Q_{load}$ to the applied load, determining the required shunt reactive power $Q_{shunt}$ based on required reactive power $Q_{req}$ and the measured reactive power $Q_{load}$ to the applied load (5), regulating the shunt reactive power compensation device (2) to deliver $Q_{shunt}$ to the AC power transmission line (1) for reaching a maximum transmission efficiency of the AC power transmission line (1) for the applied load (5); wherein, the maximum transmission efficiency parameter H is calculated based on a set of AC power transmission efficiency parameters ABCD for an AC power transmission line two port model, the ABCD parameters are determined based on a series resistance R, a shunt capacitance C, a series inductance L and a shunt conductance G, where H is determined by:

$$H = -\frac{\text{imag}\left(B * \bar{C}\right)}{\text{real}\left(2 * B * \bar{D}\right)}.$$

2. The method according to claim 1 wherein, the maximum transmission efficiency parameter H is determined based on a set of AC power maximum transmission efficiency parameters: a resistance R per unit length, a capacitance C per unit length, an inductance L per unit length, a length, and a frequency.

3. The method according to claim 1 wherein, the maximum transmission efficiency parameter H is calculated based on a set of AC power transmission line parameters, an attenuation constant α, an attenuation constant β of propagation constant γ, a series resistance of a powerline R and a length of a powerline l, where the maximum transmission efficiency parameter H is determined by:

$$H = \frac{2\alpha^2\beta^2(\cosh 2\alpha l - \cos 2\beta l)}{R(\alpha^2 + \beta^2)(\beta\sinh 2\alpha l + \alpha\sin 2\beta l)}.$$

4. The method according to claim 1 wherein, the maximum transmission efficiency parameter H for a short distance power line is estimated based on a set of powerline parameters an operational frequency f, a powerline shunt capacitance per unit length $C_{line}$ and a length of the AC power transmission line, where the maximum transmission efficiency parameter H is determined by:

$$H = \pi * f * c_{line} * l.$$

5. A device adapted to operate a AC power transmission line (1), wherein a receiving end of the AC power transmission line is connected to an applied load (5), which applied load (5) comprises an active power part and a reactive power part, wherein the device comprises a connection to a receiving end of the AC power transmission line (1), at least one shunt reactive power compensation device (2) adapted to inject reactive power into the AC power transmission line (1), wherein the at least one shunt reactive power compensation device (2) is configured to be connected to the receiving end of the AC power transmission line (1), means adapted to measure a line voltage of the AC power transmission line at the receiving end, means adapted to measure reactive power to a load $Q_{load}$, characterized in that the device further comprises:

means adapted to determine a required reactive power to be injected by the shunt reactive power compensation device (2), wherein the means adapted to determine the required shunt reactive power $Q_{shunt}$ is operated according to claim 4 for the applied load (5).

6. The method according to claim 1 wherein, the required reactive power $Q_{req}$ at the AC power transmission line (1) receiving end is determined based on the maximum transmission efficiency parameter H and the measured line voltage at the receiving end of the AC power transmission line (1), wherein $Q_{req}$ is determined by:

$$Q_{req} = H * U_r^2.$$

* * * * *